United States Patent
Onishi

(10) Patent No.: US 11,107,438 B2
(45) Date of Patent: Aug. 31, 2021

(54) CONTROL METHOD FOR DISPLAY DEVICE AND DISPLAY DEVICE

(71) Applicant: SEIKO EPSON CORPORATION, Tokyo (JP)

(72) Inventor: Takumi Onishi, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/791,173

(22) Filed: Feb. 14, 2020

(65) Prior Publication Data
US 2020/0265795 A1 Aug. 20, 2020

(30) Foreign Application Priority Data

Feb. 15, 2019 (JP) .............................. JP2019-025247

(51) Int. Cl.
*G09G 5/00* (2006.01)
*G09F 9/302* (2006.01)
*G06F 3/01* (2006.01)

(52) U.S. Cl.
CPC ............ *G09G 5/006* (2013.01); *G06F 3/011* (2013.01); *G09F 9/3023* (2013.01); *G09G 2360/04* (2013.01); *G09G 2370/20* (2013.01)

(58) Field of Classification Search
CPC ...... G09G 5/006; G09G 5/12; G09G 2370/20; G09G 2354/00; G09G 2360/04; G09G 5/14; G06F 3/011; G06F 3/1423; G09F 9/3023
See application file for complete search history.

(56) References Cited

U.S. PATENT DOCUMENTS

| | | | |
|---|---|---|---|
| 2009/0037946 A1* | 2/2009 | Chang | H04N 21/4756 725/24 |
| 2011/0134247 A1 | 6/2011 | Minegishi | |
| 2012/0023522 A1* | 1/2012 | Anderson | H04L 12/14 725/35 |
| 2019/0104596 A1* | 4/2019 | Den Hartog | H05B 47/12 |

FOREIGN PATENT DOCUMENTS

JP     2011-118279 A     6/2011

* cited by examiner

*Primary Examiner* — Muhammad N Edun
(74) *Attorney, Agent, or Firm* — Oliff PLC

(57) ABSTRACT

A control method for a display device includes displaying a first image on a first display surface, specifying the number of first people viewing the first image displayed on the first display surface, receiving, a second image different from the first image on a second display surface different from the first display surface, number-of-people information indicating a specifying result of the number of second people viewing the second image displayed on the second display surface, comparing the number of the first and second people, and displaying the second image on the first display surface when the number of the first people is smaller than the number of the second people and transmitting, to the other display device, first image instruction information for instructing display of the first image on the second display surface when the number of the first people is larger than the number of the second people.

12 Claims, 6 Drawing Sheets

CONTROL METHOD FOR DISPLAY DEVICE AND DISPLAY DEVICE

The present application is based on, and claims priority from JP Application Serial Number 2019-025247, filed Feb. 15, 2019, the disclosure of which is hereby incorporated by reference herein in its entirety.

BACKGROUND

1. Technical Field

The present disclosure relates to a control method for a display device and the display device.

2. Related Art

JP A-2011-118279 describes a technique capable of solving a situation in which people concentrate on any one of a plurality of display devices. In the technique described in JP A-2011-118279, in a display device on which the largest number of viewers are viewing a displayed image among the plurality of display devices, the displayed image is changed to another image and, in a display device on which the smallest number of viewers are viewing a displayed image among the plurality of display devices, the displayed image is maintained.

An image viewed by a large number of viewers is assumed to be an image in which the viewers have high interest. Therefore, in the technique described in JP A-2011-118279, the image in which the viewers is assumed to have high interest is changed to another image. This is undesirable for the viewers.

SUMMARY

A control method for a display device according to an aspect of the present disclosure is a control method for a display device including: displaying a first image on a first display surface; specifying a number of first people viewing the first image displayed on the first display surface; receiving, from another display device that displays a second image different from the first image on a second display surface different from the first display surface, number-of-people information indicating a specifying result of a number of second people viewing the second image displayed on the second display surface; comparing the number of the first people and the number of the second people; and displaying the second image on the first display surface when the number of the first people is smaller than the number of the second people and transmitting, to the other display device, first image instruction information for instructing display of the first image on the second display surface when the number of the first people is larger than the number of the second people.

A display device according to an aspect of the present disclosure is a display device including: a display section configured to display a first image on a first display surface; a specifying section configured to specify a number of first people viewing the first image displayed on the first display surface; a communication section configured to receive, from another display device that displays a second image different from the first image on a second display surface different from the first display surface, number-of-people information indicating a specifying result of a number of second people viewing the second image displayed on the second display surface; a comparing section configured to compare the number of the first people and the number of the second people; and a control section configured to control the display section to display the second image on the first surface when the number of the first people is smaller than the number of the second people and control the communication section to transmit, to the other display device, first image instruction information for instructing display of the first image on the second display surface when the number of the first people is larger than the number of the second people.

DESCRIPTION OF EXEMPLARY EMBODIMENTS

A. First Embodiment

A1. Overview of a Projector System 1000

Figure 1:
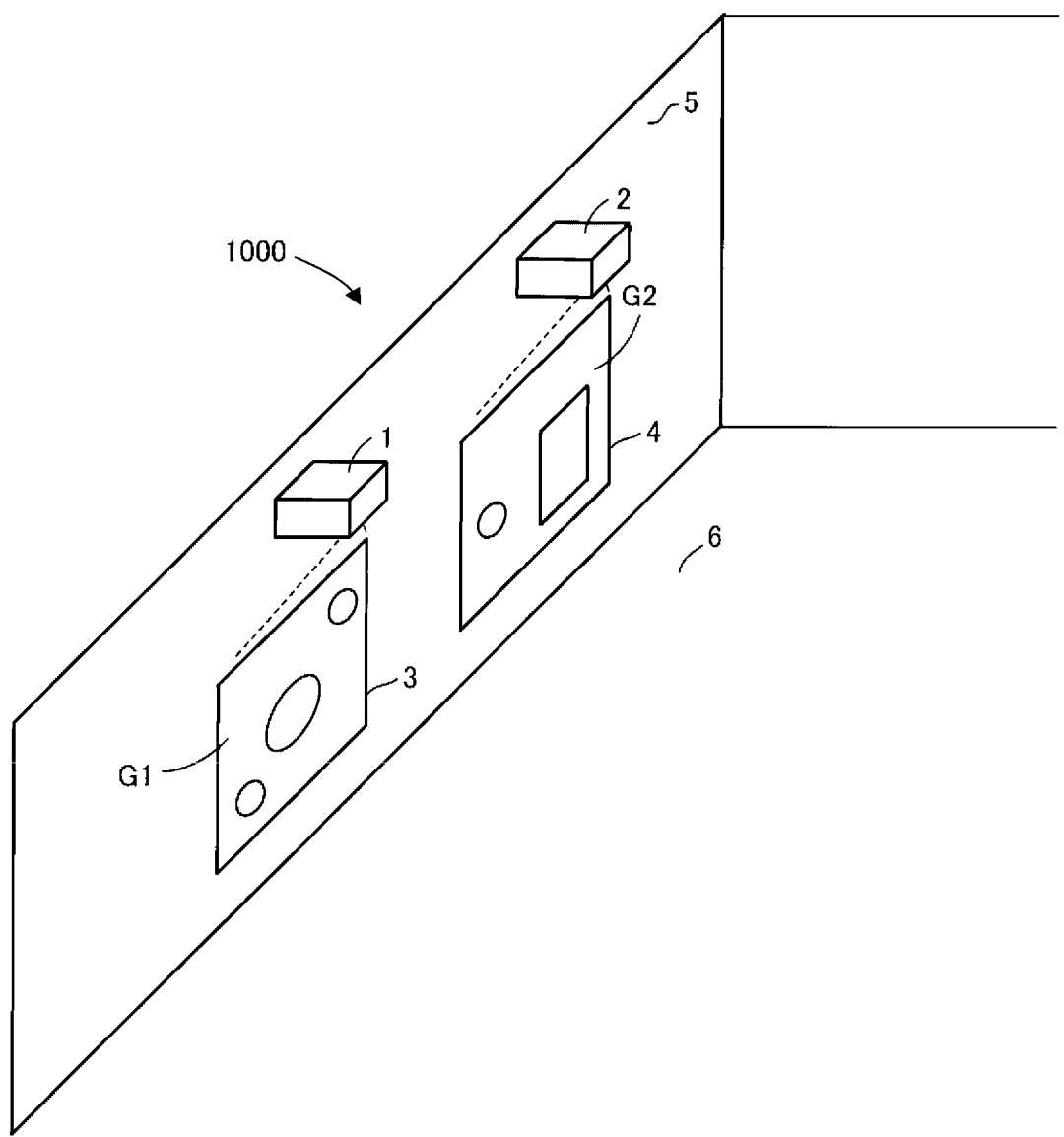
FIG. 1 is a diagram showing an example of a projector system according to a first embodiment.

FIG. 1 is a diagram showing an example of a projector system 1000 according to a first embodiment. The projector system 1000 includes a first projector 1 and a second projector 2. The first projector 1 functions as a master projector. The second projector 2 functions as a slave projector. The first projector 1 is an example of a display device. The second projector 2 is an example of another display device. The number of projectors included in the projector system 1000 is not limited to two and may be three or more.

The projector system 1000 is set in a place with pedestrian traffic, for example, a store, an airport, a station, an open space, or a passage and displays a moving image such as an advertisement.

The first projector 1 is fixed to a portion located above a first projection surface 3 on a wall 5. The wall 5 is an inner wall. The wall 5 may be an outer wall. The wall 5 is an example of a predetermined surface. The second projector 2 is fixed to a portion located above a second projection surface 4 on the wall 5. Each of the first projector 1 and the second projector 2 may be placed flat on a desk, a table, or a floor 6. Each of the first projector 1 and the second projector 2 may be suspended from a ceiling.

The first projector 1 projects various images onto the first projection surface 3 to thereby display the various images on the first projection surface 3. In the example shown in FIG. 1, the first projector 1 displays a first moving image G1 named A on the first projection surface 3. The first moving image G1 is so-called moving image content. The first moving image G1 is an example of a first image. The first image is not limited to a moving image and may be a still image.

The first projector 1 can display a second moving image G2 named B on the first projection surface 3 instead of the display of the first moving image G1 on the first projection surface 3. The second moving image G2 is moving image content different from the first moving image G1. The second moving image G2 is an example of a second image. The second image is not limited to a moving image and may be a still image.

The second projector 2 projects various images onto the second projection surface 4 to thereby display the various images on the second projection surface 4. In the example shown in FIG. 1, the second projector 2 displays the second moving image G2 on the second projection surface 4. The second projector 2 can display the first moving image G1 on the second projection surface 4 instead of the display of the second moving image G2 on the second projection surface 4.

The first projection surface 3 is an example of a first display surface. The second projection surface 4 is an example of a second display surface. Each of the first projection surface 3 and the second projection surface 4 is, for example, a screen fixed to the wall 5. Each of the first projection surface 3 and the second projection surface 4 is not limited to the screen and may be, for example, a portion of the wall 5 or a white board. In the example shown in FIG. 1, the first projection surface 3 and the second projection surface 4 are located in positions different from each other of the wall 5. The sizes of the first projection surface 3 and the second projection surface 4 are equal to each other. The sizes of the first projection surface 3 and the second projection surface 4 may be different from each other.

The first projector 1 specifies the number of people viewing the first moving image G1 displayed on the first projection surface 3. The people viewing the first moving image G1 displayed on the first projection surface 3 are hereinafter referred to as "first people". The first projector 1 images a first region R1 where the first people are assumed to be present and specifies the number of the first people based on an imaging result of the first region R1.

The second projector 2 specifies the number of people viewing the second moving image G2 displayed on the second projection surface 4. The people viewing the second moving image G2 displayed on the second projection surface 4 are hereinafter referred to as "second people". The second projector 2 images a second region R2 where the second people are assumed to be present and specifies the number of the second people based on an imaging result of the second region R2.

A2. Regions to be Imaged

Figure 2:
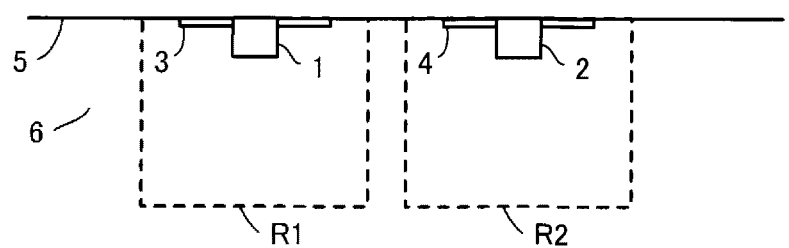
FIG. 2 is a diagram showing an example of a first region and a second region.

FIG. 2 is a diagram showing an example of the first region R1 and the second region R2. The first region R1 is provided in the front of the first projection surface 3. The second region R2 is provided in the front of the second projection surface 4. In the example shown in FIG. 2, the sizes of the first region R1 and the second region R2 are equal to each other. The sizes of the first region R1 and the second region R2 may be different from each other.

A3. An Example of the First Projector 1

Figure 3:
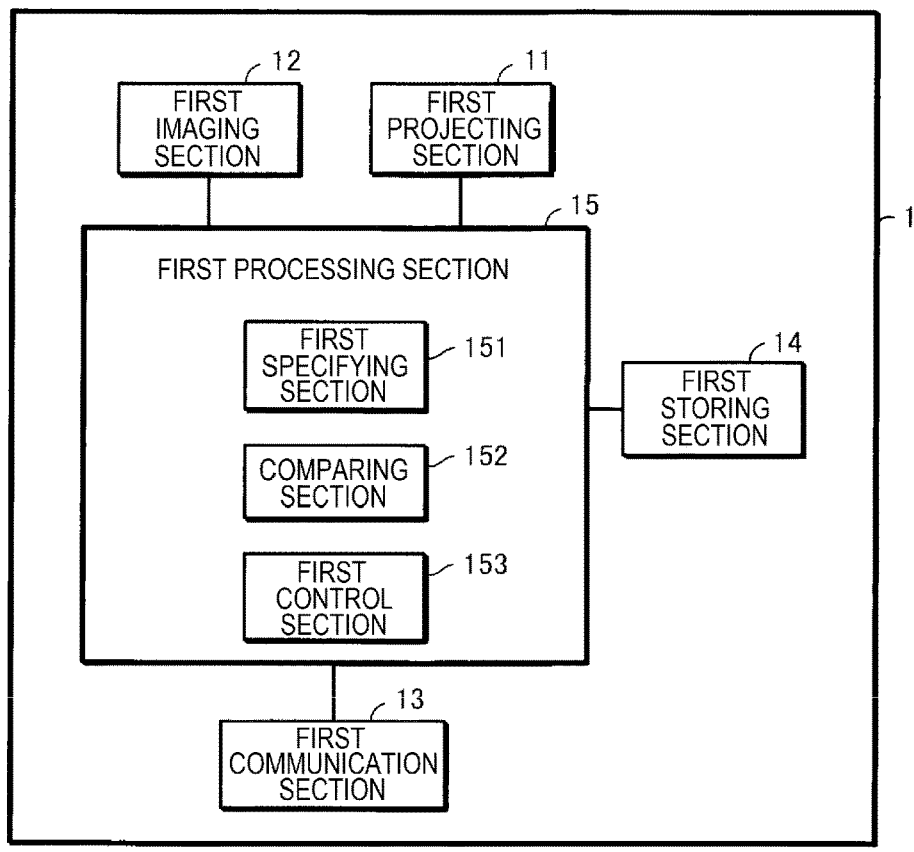
FIG. 3 is a diagram showing an example of a first projector.

FIG. 3 is a diagram showing an example of the first projector 1. The first projector 1 includes a first projecting section 11, a first imaging section 12, a first communication section 13, a first storing section 14, and a first processing section 15.

The first projecting section 11 projects various images onto the first projection surface 3 to thereby display the various images on the first projection surface 3. For example, the first projecting section 11 projects the first moving image G1 onto the first projection surface 3. The first projecting section 11 projects the second moving image G2 onto the first projection surface 3 instead of the first moving image G1. The first projecting section 11 is an example of a display section.

The first imaging section 12 is, for example, a camera. The first imaging section 12 includes an optical system such as a lens and an imaging element that converts light condensed by the optical system into an electric signal. The imaging element is, for example, a CCD (Charge Coupled Device) image sensor. The imaging element is not limited to the CCD image sensor and may be, for example, a CMOS (Complementary Metal Oxide Semiconductor) image sensor. The first imaging section 12 images the first region R1 to thereby generate first imaging data indicating a first captured image.

The first communication section 13 communicates with the second projector 2. The first communication section 13 is an example of a communication section. The communication between the first communication section 13 and the second projector 2 is executed by, for example, wireless LAN (Local Area Network) communication. The communication between the first communication section 13 and the second projector 2 is not limited to the wireless LAN communication and may be executed by, for example, wired communication.

The first communication section 13 receives number-of-people information indicating a specifying result of the number of the second people from the second projector 2. The number-of-people information indicating the specifying result of the number of the second people is hereinafter referred to as "number-of-second-people information".

The first storing section 14 is a recording medium readable by the first processing section 15. The first storing section 14 is configured by, for example, a nonvolatile memory and a volatile memory. Examples of the nonvolatile memory include a ROM (Read Only Memory), an EPROM (Erasable Programmable Read Only Memory), and an EEPROM (Electrically Erasable Programmable Read Only Memory). Examples of the volatile memory include a RAM (Random Access Memory).

The first storing section 14 stores a control program to be executed by the first processing section 15 and various data to be used by the first processing section 15. The various data to be used by the first processing section 15 includes first image information indicating the first moving image G1 and second image information indicating the second moving image G2.

The first processing section 15 controls the first projector 1 and the second projector 2. The first processing section 15 is configured by, for example, a single or a plurality of processors. As an example, the first processing section 15 is configured by a CPU (Central Processing Unit). A part or all of functions of the first processing section 15 may be configured by hardware such as a DSP (Digital Signal Processor), an ASIC (Application Specific Integrated Circuit), a PLD (Programmable Logic Device), or an FPGA (Field Programmable Gate Array). The first processing section 15 executes various kinds of processing in parallel or sequentially.

The first processing section 15 reads the control program from the first storing section 14 and executes the control program to thereby function as a first specifying section 151, a comparing section 152, and a first control section 153.

The first specifying section 151 specifies the number of the first people. The first specifying section 151 is an example of a specifying section. For example, the first specifying section 151 specifies the number of the first people based on the first imaging data generated by the first imaging section 12.

The comparing section 152 compares the number of the first people specified by the first specifying section 151 and the number of the second people indicated by the number-of-second-people information. As an example, the comparing section 152 determines the number of the first people and the number of the second people in a situation in which one of the number of the first people and the number of the second people is smaller than a first threshold and the other of the number of the first people and the number of the second people exceeds a second threshold. The second threshold is larger than the first threshold. The first threshold is, for example, five. The second threshold is, for example, fifteen. The first threshold and the second threshold are not limited to the values described above and can be changed as appropriate in a range in which a condition that the second threshold is larger than the first threshold is satisfied.

The first control section 153 controls the first projector 1 and the second projector 2. For example, the first control section 153 determines each of an image displayed on the first projection surface 3 by the first projector 1 and an image displayed on the second projection surface 4 by the second projector 2.

As an example, according to a start of the projector system 1000, the first control section 153 controls the first communication section 13 to thereby transmit second image instruction information for instructing display of the second moving image G2 on the second projection surface 4 to the second projector 2. The second projector 2 projects the second moving image G2 onto the second projection surface 4 according to reception of the second image instruction information.

According to the start of the projector system 1000, the first control section 153 reads out the first image information from the first storing section 14 and provides the first image information to the first projecting section 11. When the first image information is provided, the first projecting section 11 projects the first moving image G1 onto the first projection surface 3 using the first image information.

When the number of the first people is smaller than the number of the second people, specifically, when a comparison result in the comparing section 152 indicates that the number of the first people is smaller than the number of the second people, the first control section 153 controls the first projecting section 11 to display the second moving image G2 on the first projection surface 3. Specifically, the first control section 153 reads out the second image information from the first storing section 14 and provides the second image information to the first projecting section 11. When the second image information is provided, the first projecting section 11 projects the second moving image G2 onto the first projection surface 3 using the second image information.

When the number of the first people is larger than the number of the second people, specifically, when the comparison result in the comparing section 152 indicates that the number of the first people is larger than the number of the second people, the first control section 153 controls the first communication section 13 to transmit first image instruction information for instructing display of the first moving image G1 on the second projection surface 4 to the second projector 2. According to reception of the first image instruction information, the second projector 2 projects the first moving image G1 onto the second projection surface 4.

When the number of the first people is equal to the number of the second people, the first control section 153 maintains the display by the first projector 1 and the display by the second projector 2.

Each of the first specifying section 151, the comparing section 152, and the first control section 153 may be configured by hardware such as a DSP, an ASIC, a PLD, or an FPGA and, more specifically, may be configured by a circuit.

A4. An Example of the Second Projector 2

Figure 4:
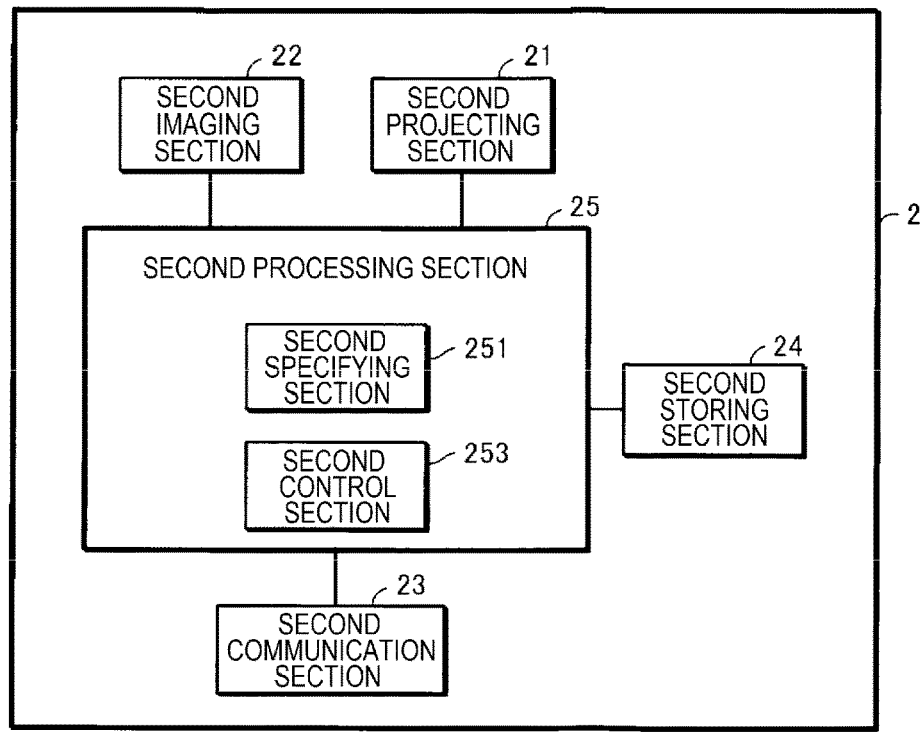
FIG. 4 is a diagram showing an example of a second projector.

FIG. 4 is a diagram showing an example of the second projector 2. The second projector 2 includes a second projecting section 21, a second imaging section 22, a second communication section 23, a second storing section 24, and a second processing section 25.

The second projecting section 21 projects various images onto the second projection surface 4 to thereby display the various images on the second projection surface 4. For example, the second projecting section 21 projects the second moving image G2 onto the second projection surface 4. The second projecting section 21 projects the first moving image G1 onto the second projection surface 4 instead of the second moving image G2.

The second imaging section 22 is, for example, a camera. Like the first imaging section 12, the second imaging section 22 includes an optical system such as a lens and an imaging element that converts light condensed by the optical system into an electric signal. The second imaging section 22 images the second region R2 to thereby generate second imaging data indicating a second captured image.

The second communication section 23 communicates with the first projector 1. The communication between the second communication section 23 and the first projector 1 means the communication between the first communication section 13 and the second projector 2 explained above. The second communication section 23 transmits the number-of-second-people information to the first projector 1.

The second storing section 24 is a recording medium readable by the second processing section 25. The second storing section 24 is configured by, for example, a nonvolatile memory and a volatile memory. The second storing section 24 stores a control program to be executed by the second processing section 25 and various data to be used by the second processing section 25. The various data to be used by the second processing section 25 includes the first image information indicating the first moving image G1 and the second image information indicating the second moving image G2.

The second processing section 25 controls the second projector 2. The second processing section 25 is configured by, for example, a single or a plurality of processors. As an example, the second processing section 25 is configured by a CPU. A part or all of functions of the second processing section 25 may be configured by hardware such as a DSP, an ASIC, a PLD, or an FPGA. The second processing section 25 executes various kinds of processing in parallel or sequentially.

The second processing section 25 reads the control program from the second storing section 24 and executes the control program to thereby function as a second specifying section 251 and a second control section 253.

The second specifying section 251 specifies the number of the second people. For example, the second specifying section 251 specifies the number of the second people based on the second imaging data generated by the second imaging section 22. A method with which the second specifying section 251 specifies the number of the second people is the same as the method with which the first specifying section 151 specifies the number of the first people. The method with which the second specifying section 251 specifies the number of the second people may be different from the method with which the first specifying section 151 specifies the number of the first people.

The second control section 253 controls the second projector 2. For example, the second control section 253 generates number-of-second-people information indicating a specifying result of the number of second peoples by the second specifying section 251. The second control section 253 controls the second communication section 23 to transmit the number-of-second-people information to the first projector 1.

When the second communication section 23 receives the first image instruction information from the first projector 1, the second control section 253 reads out the first image information from the second storing section 24 and provides the first image information to the second projecting section 21. The second projecting section 21 projects the first moving image G1 onto the second projection surface 4 according to the provision of the first image information.

When the second communication section 23 receives the second image instruction information from the first projector 1, the second control section 253 reads out the second image information from the second storing section 24 and provides the second image information to the second projecting section 21. The second projecting section 21 projects the second moving image G2 onto the second projection surface 4 according to the provision of the second image information.

Each of the second specifying section 251 and the second control section 253 may be configured by hardware such as a DSP, an ASIC, a PLD, or an FPGA and, more specifically, may be configured by a circuit.

A5. An Example of the First Projecting Section 11 and the Second Projecting Section 21

The first projecting section 11 and the second projecting section 21 have the same configuration each other. Accordingly, for simplification of explanation, only the first projecting section 11 is explained.

Figure 5:
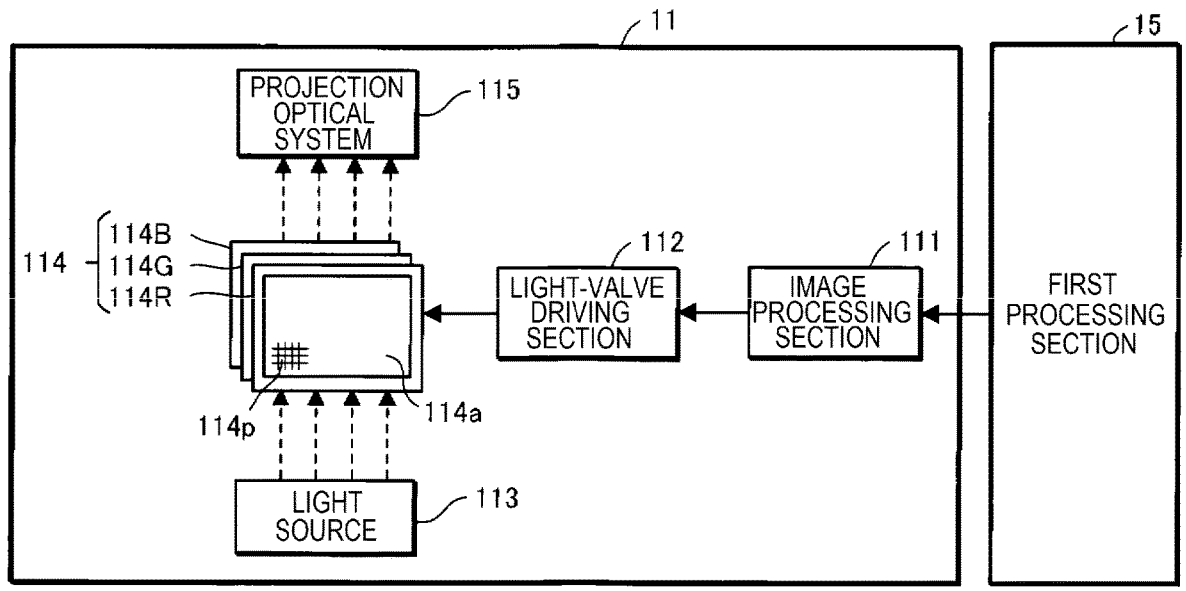
FIG. 5 is a diagram showing an example of a first projecting section.

FIG. 5 is a diagram showing an example of the first projecting section 11. The first projecting section 11 includes an image processing section 111, a light-valve driving section 112, a light source 113, a liquid crystal light valve for red 114R, a liquid crystal light valve for green 114G, a liquid crystal light valve for blue 114B, and a projection optical system 115. In the following explanation, when it is unnecessary to distinguish the liquid crystal light valve for red 114R, the liquid crystal light valve for green 114G, and the liquid crystal light valve for blue 114B from one another, these liquid crystal light valves are referred to as "liquid crystal light valve 114".

The image processing section 111 is a processing device such as an image processor. The image processing section 111 is configured by one or a plurality of processing devices. The image processing section 111 applies image processing to image information provided from the first processing section 15 to thereby generate an image signal.

The image processing executed by the image processing section 111 includes, for example, resolution conversion processing. In the resolution conversion processing, the image processing section 111 converts resolution of the image information into, for example, resolution of the liquid crystal light valve 114. The image processing section 111 may execute other image processing, for example, gamma correction processing in addition to the resolution conversion processing.

The light-valve driving section 112 is, for example, a driver. The light-valve driving section 112 drives the liquid crystal light valve 114 based on an image signal input from the image processing section 111.

The light source 113 is, for example, an LED (Light Emitting Diode). The light source 113 is not limited to the LED and may be, for example, a Xenon lamp, an ultra-high pressure mercury lamp, or a laser beam source. After fluctuation in a luminance distribution of light emitted from the light source 113 is reduced by a not-shown integrator optical system, the light is separated into color light components of red, green, and blue, which are the three primary colors of light, by a not-shown color separation optical system. The color light component of red is made incident on the liquid crystal light valve for red 114R. The color light component of green is made incident on the liquid crystal light valve for green 114G. The color light component of blue is made incident on the liquid crystal light valve for blue 114B.

The liquid crystal light valve 114 is configured by a liquid crystal panel or the like in which liquid crystal is present between a pair of transparent substrates. The liquid crystal light valve 114 includes a rectangular pixel region 114$a$ including a plurality of pixels 114$p$ located in a matrix shape. In the liquid crystal light valve 114, a driving voltage is applied to the liquid crystal for each of the pixels 114$p$. When the light-valve driving section 112 applies a driving voltage based on an image signal to the pixels 114$p$, the pixels 114$p$ are set to light transmittance based on the driving voltage. Light emitted from the light source 113 passes through the pixel region 114$a$ to be modulated. An image based on the image signal is formed for each of the color lights. The liquid crystal light valve 114 is an example of a light modulating device.

Images of the colors are combined for each of the pixels 114$p$ by a not-shown color combination optical system and a color image is generated. The color image is projected via the projection optical system 115.

Figure 6:
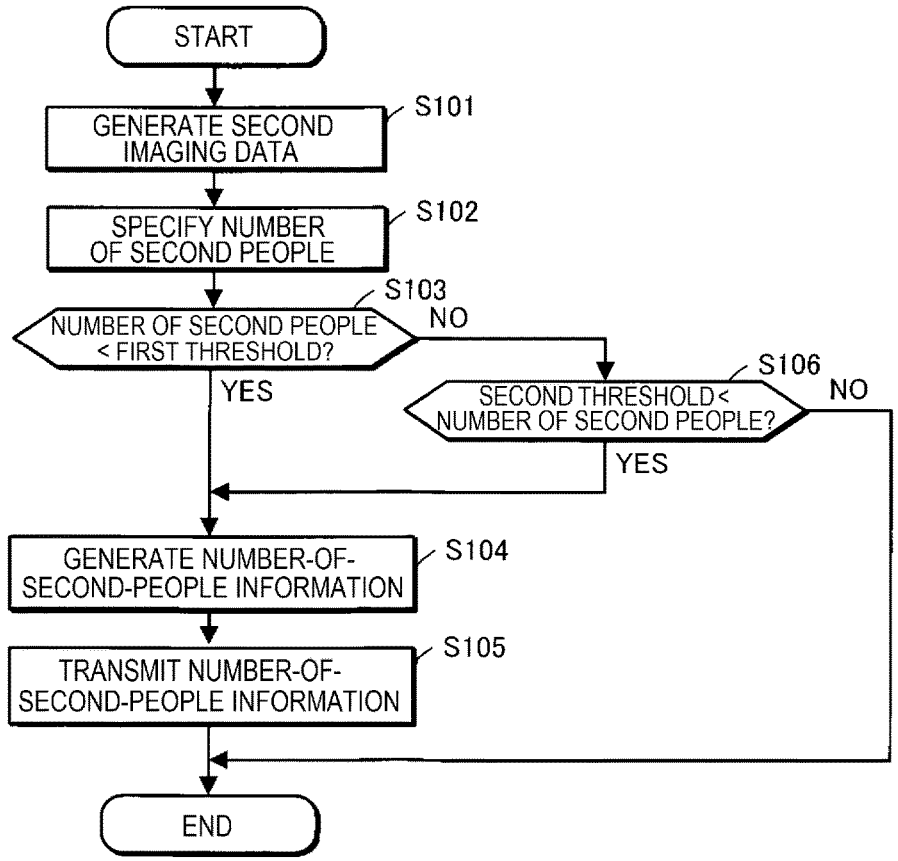
FIG. 6 is a flowchart for explaining an example of an operation for transmitting number-of-second-people information.

A6. An Example of an Operation for Transmitting the Number-of-Second-People Information by the Second Projector FIG. 6 is a flowchart for explaining an example of an operation for transmitting the number-of-second-people information by the second projector 2. The operation illustrated in FIG. 6 is executed at every first specific time. The first specific time is, for example, ten minutes. The first specific time is not limited to ten minutes and may be longer than ten minutes or may be shorter than ten minutes. In the following explanation, it is assumed that the second projector 2 projects the second moving image G2 onto the second projection surface 4 according to reception of the second image instruction information transmitted from the first projector 1.

In step S101, the second imaging section 22 images the second region R2 to thereby generate second imaging data indicating a second captured image. The second people located in the second region R2 are shown in the second captured image.

Subsequently, in step S102, the second specifying section 251 specifies the number of the second people based on the second imaging data. For example, the second specifying section 251 detects faces of people imaged in the second captured image indicated by the second imaging data and specifies the number of the detected faces of the people as the number of the second people. The second specifying section 251 may specify faces, lines of sight of which are directed to the second projection surface 4, among the detected faces of the people and specify the number of faces, lines of sight of which are directed to the second projection surface 4, as the number of the second people.

Subsequently, when the number of the second people is smaller than the first threshold in step S103, in step S104, the second control section 253 generates number-of-second-people information indicating the number of the second people.

After generating the number-of-second-people information, in step S105, the second control section 253 controls the second communication section 23 to transmit the number-of-second-people information to the first projector 1. In the first projector 1, when the first communication section 13 receives the number-of-second-people information, the first control section 153 stores the number-of-second-people information received by the first communication section 13 in the first storing section 14.

When the number of the second people is equal to or larger than the first threshold in step S103, in step S106, the second control section 253 determines whether the number of the second people exceeds the second threshold.

When determining in step S106 that the number of the second people exceeds the second threshold, the second control section 253 executes steps S104 and S105.

On the other hand, when determining in step S106 that the number of the second people does not exceed the second threshold, that is, the number of the second people is equal to or larger than the first threshold and equal to or smaller than the second threshold, steps S104 and S105 are not executed and the processing shown in FIG. 6 ends.

In FIG. 6, steps S103 and S106 may be omitted. In this case, the second projector 2 transmits the number-of-second-people information to the first projector 1 irrespective of the number of the second people. Therefore, the operation of the second projector 2 can be simplified.

On the other hand, when steps S103 and S106 are not omitted in FIG. 6, the second projector 2 transmits the number-of-second-people information to the first projector 1 in a situation in which the number of the second people is smaller than the first threshold and a situation in which the number of the second people exceeds the second threshold. That is, when the number of the second people is equal to or larger than the first threshold and equal to or smaller than the second threshold, the second projector 2 does not transmit the number-of-second-people information.

Therefore, compared with a configuration in which the second projector 2 transmits the number-of-second-people information to the first projector 1 irrespective of the number of the second people, it is possible to reduce a frequency of transmitting the number-of-second-people information and reduce a load of communication.

A7. An Example of the Operation of the First Projector 1

Figure 7:
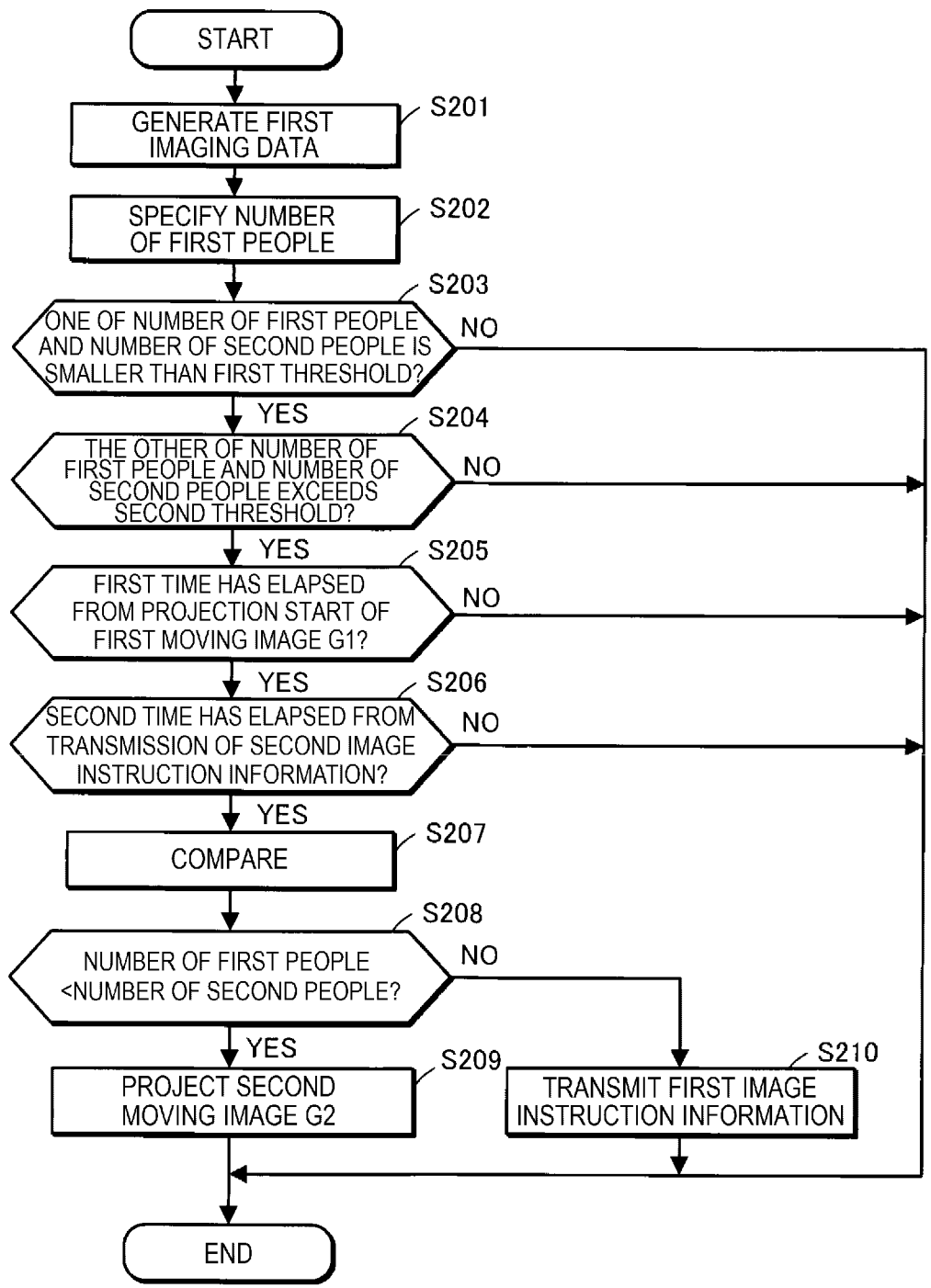
FIG. 7 is a flowchart for explaining an example of an operation of the first projector.

FIG. 7 is a flowchart for explaining an example of the operation of the first projector 1. The operation illustrated in FIG. 7 is executed at every second specific time. The second specific time is, for example, ten minutes. The second specific time is not limited to ten minutes and may be longer than ten minutes or may be shorter than ten minutes.

In the following explanation, for simplification of explanation, an operation performed when the first projector 1 is projecting the first moving image G1 onto the first projection surface 3 and the second projector 2 is projecting the second moving image G2 onto the second projection surface 4 according to the second image instruction information is explained.

In step S201, the first imaging section 12 images the first region R1 to thereby generate first imaging data indicating a first captured image. The first people located in the first region R1 are shown in the first captured image.

Subsequently, in step S202, the first specifying section 151 specifies the number of the first people based on the first imaging data. For example, the first specifying section 151 detects faces of people imaged in the first captured image indicated by the first imaging data and specifies the number of the detected faces of the people as the number of the first people. The first specifying section 151 may specify faces, lines of sight of which are directed to the first projection surface 3, among the detected faces of the people and specify the number of faces, lines of sight of which are directed to the first projection surface 3, as the number of the first people.

Subsequently, in step S203, the comparing section 152 determines whether one of the number of the first people specified by the first specifying section 151 and the number of the second people indicated by the latest number-of-second-people information stored in the first storing section 14 is smaller than the first threshold.

In the following explanation, for simplification of explanation, the number of the first people specified by the first specifying section 151 is simply referred to as "number of the first people" and the number of the second people indicated by the latest number-of-second-people information stored in the first storing section 14 is simply referred to as "number of the second people".

When determining in step S203 that one of the number of the first people and the number of the second people is not smaller than the first threshold, the comparing section 152 ends the processing shown in FIG. 7.

On the other hand, when determining in step S203 that one of the number of the first people and the number of the second people is smaller than the first threshold, in step S204, the comparing section 152 determines whether the other of the number of the first people and the number of the second people exceeds the second threshold.

When determining in step S204 that the other of the number of the first people and the number of the second people does not exceed the second threshold, the comparing section 152 ends the processing shown in FIG. 7.

On the other hand, when determining in step S204 that the other of the number of the first people and the number of the second people exceeds the second threshold, in step S205, the comparing section 152 determines whether a first time has elapsed from projection start timing of the first moving image G1. The first time is, for example, five minutes. The first time is not limited to five minutes and may be longer than five minutes or may be shorter than five minutes. The first time may be shorter than a temporal length of moving image content, which is the first moving image G1.

When determining in step S205 that the first time has not elapsed from the projection start timing of the first moving image G1, the comparing section 152 ends the processing shown in FIG. 7.

On the other hand, when determining in step S205 that the first time has elapsed from the projection start timing of the first moving image G1, in step S206, the comparing section 152 determines whether a second time has elapsed from transmission timing of the second image instruction information. The second time is, for example, five minutes. The second time is not limited to five minutes and may be longer than five minutes or may be shorter than five minutes. The second time may be shorter than a temporal length of moving image content, which is the second moving image G2.

When determining in step S206 that the second time has not elapsed from the transmission timing of the second image instruction information, the comparing section 152 ends the processing shown in FIG. 7.

On the other hand, when determining in step S206 that the second time has elapsed from the transmission timing of the second image instruction information, in step S207, the comparing section 152 compares the number of the first people and the number of the second people.

When the number of the first people is smaller than the number of the second people in step S208, in step S209, the first control section 153 changes image information provided to the first projecting section 11 from the first image information to the second image information to thereby cause the first projecting section 11 to project the second moving image G2 onto the first projection surface 3. Therefore, each of the first projector 1 and the second projector 2 projects the second moving image G2.

When the number of the first people is larger than the number of the second people in step S208, in step S210, the first control section 153 controls the first communication section 13 to transmit the first image instruction information for instructing display of the first moving image G1 on the second projection surface 4 to the second projector 2. The second projector 2 projects the first moving image G1 onto the second projection surface 4 according to reception of the first image instruction information. Therefore, each of the first projector 1 and the second projector 2 projects the first moving image G1.

A8. An Example of a Display Operation by the Second Projector 2

Figure 8:
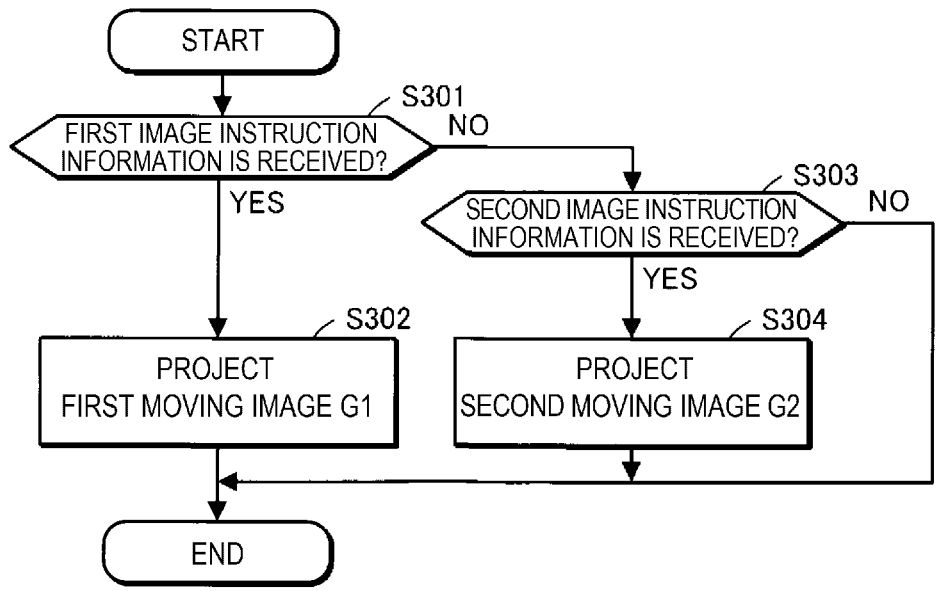
FIG. 8 is a flowchart for explaining an example of a display operation by the second projector.

FIG. 8 is a flowchart for explaining an example of a display operation by the second projector 2.

When the second communication section 23 receives the first image instruction information from the first projector 1 in step S301, the second control section 253 reads out the first image information from the second storing section 24 and provides the first image information to the second projecting section 21. In step S302, the second projecting section 21 projects the first moving image G1 onto the second projection surface 4 according to the provision of the first image information.

On the other hand, when the second communication section 23 does not receive the first image instruction information in step S301 and receives the second image instruction information in step S303, the second control section 253 reads out the second image information from the second storing section 24 and provides the second image information to the second projecting section 21. In step S304, the second projecting section 21 projects the second moving image G2 onto the second projection surface 4 according to the provision of the second image information.

A9. A Transition Example of Display by the Projector System 1000

A transition example of display by the projector system 1000 corresponding to a magnitude relation between the number of the first people and the number of the second people is explained.

Figure 9:
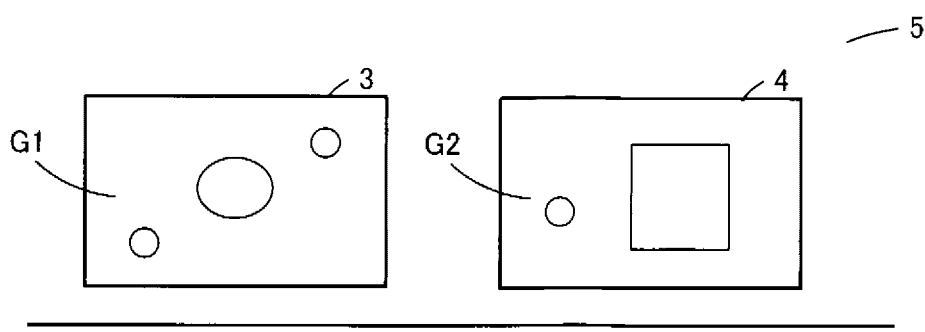
FIG. 9 is a diagram showing an example of projection by the projector system.

During the start of the projector system 1000, as illustrated in FIG. 9, the first moving image G1 is displayed on the first projection surface 3 and the second moving image G2 is displayed on the second projection surface 4.

Figure 10:
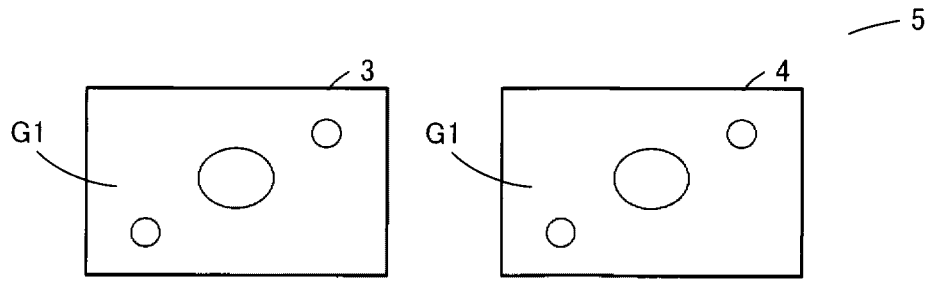
FIG. 10 is a diagram showing another example of the projection by the projector system.

When the number of the first people exceeds the second threshold and the number of the second people is smaller than the first threshold in a situation illustrated in FIG. 9, as illustrated in FIG. 10, the first moving image G1 is displayed on both of the first projection surface 3 and the second projection surface 4.

Therefore, it is possible to switch a moving image displayed on the second projection surface 4 from a moving image in which viewers have low interest and to which the viewers are hardly attracted to a moving image in which viewers have high interest and to which the viewers are attracted.

Figure 11:
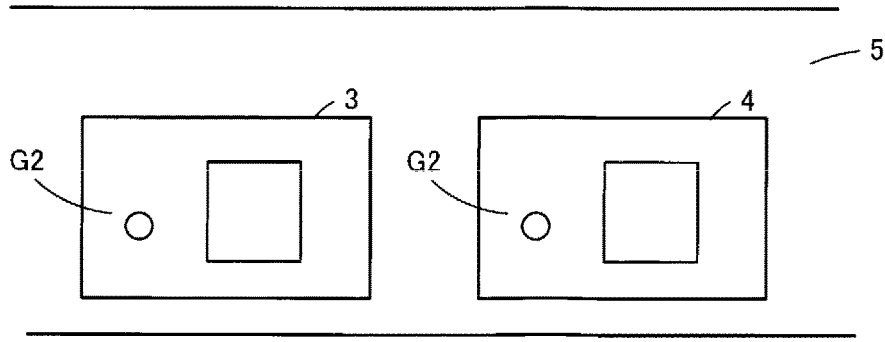
FIG. 11 is a diagram showing another example of the projection by the projector system.

On the other hand, when the number of the first people is smaller than the first threshold and the number of the second people exceeds the second threshold in the situation illustrated in FIG. 9, as illustrated in FIG. 11, the second moving image G2 is displayed on both of the first projection surface 3 and the second projection surface 4.

Therefore, it is possible to switch a moving image displayed on the first projection surface 3 from a moving image in which viewers have low interest and to which the viewers are hardly attracted to a moving image in which viewers have high interest and to which the viewers are attracted.

When it is likely that viewers of a moving image displayed by the projector system 1000 change according to date and time, it is likely that a moving image in which the viewers have high interest changes because the viewers change. Therefore, the display may be returned to the situation illustrated in FIG. 9 after a predetermined time elapses from display of the same moving image on the first projection surface 3 and the second projection surface 4.

A10. Overview about the First Embodiment

With the control method for the display device and the display device according to this embodiment, the first projecting section 11 displays the first moving image G1 on the first projection surface 3. The first specifying section 151 specifies the number of the first people viewing the first moving image G1 displayed on the first projection surface 3. The first communication section 13 receives, from the second projector 2, the number-of-second-people information indicating the specifying result of the number of the second people viewing the second moving image G2 displayed on the second projection surface 4. The comparing section 152 compares the number of the first people and the number of the second people. When the number of the first people is smaller than the number of the second people, the first control section 153 controls the first projecting section 11 to display the second moving image G2 on the first projection surface 3. When the number of the first people is larger than the number of the second people, the first control section 153 controls the first communication section 13 to transmit the first image instruction information for instructing display of the first moving image G1 on the second projection surface 4 to the second projector 2.

Therefore, it is possible to suppress an image in which viewers are assumed to have high interest from being changed to another image. It is possible to switch display of a moving image in which viewers have low interest and to which the viewers are hardly attracted to display of a moving image in which viewers have high interest and to which the viewers are attracted.

The number-of-second-people information is transmitted from the second projector 2 in a situation in which the number of the second people is smaller than the first threshold and a situation in which the number of the second people exceeds the second threshold larger than the first threshold.

Therefore, compared with a configuration for transmitting the number-of-second-people information to the first projector 1 irrespective of the number of the second people, it is possible to reduce a frequency of the first communication section 13 receiving the number-of-second-people information. It is possible to reduce a load of communication.

The comparing section 152 executes the comparison in a situation in which one of the number of the first people and the number of the second people is smaller than the first threshold and the other of the number of the first people and the number of the second people exceeds the second threshold.

Therefore, when a difference between the number of the first people and the number of the second people is, for example, equal to or smaller than a difference between the first threshold and the second threshold, the comparison is not performed. The display of the first moving image G1 and the second moving image G2 is maintained. Accordingly, it is possible to suppress the display from being frequently switched.

Immediately after the display of the first moving image G1 is started, it is likely that people interested in the first moving image G1 have not noticed the display of the first moving image G1 yet and are not viewing the first moving image G1. Therefore, immediately after the display of the first moving image G1 is started, it is likely that a specifying result of the first specifying section 151, that is, the number of the first people does not represent a degree of the interest of the people in the first moving image G1.

The comparing section 152 executes the comparison after the first time elapses from a start of the display of the first moving image G1 on the first projection surface 3 by the first projecting section 11. Therefore, the comparing section 152 can execute the comparison using the number of the first people highly likely to represent a degree of the interest of the people in the first moving image G1. Accordingly, it is possible to switch display of a moving image in which viewers have low interest and to which the viewers are hardly attracted to display of a moving image in which viewers have high interest and to which the viewers are attracted.

Immediately after the display of the second moving image G2 is started, people interested in the second moving image G2 have not noticed the display of the second moving image G2 yet and are not viewing the second moving image G2. Therefore, immediately after the display of the second moving image G2 is started, it is likely that the number of the second people indicated by the number-of-second-people information does not represent a degree of the interest of the people in the second moving image G2.

The comparing section 152 executes the comparison after the second time elapses from the transmission of the second image instruction information to the second projector 2. Therefore, the comparing section 152 can execute the comparison using the number of the second people highly likely to represent a degree of the interest of the people in the second moving image G2. Accordingly, it is possible to switch display of a moving image in which viewers have low interest and to which the viewers are hardly attracted to display of a moving image in which viewers have high interest and to which the viewers are attracted.

The first projection surface 3 and the second projection surface 4 are located in portions different from each other of the wall 5, which is an example of a predetermined surface. Therefore, it is highly likely that the first people are viewing the first moving image G1 after comparing the first moving image G1 displayed on the first projection surface 3 and the second moving image G2 displayed on the second projection surface 4 and the second people are viewing the second moving image G2 after comparing the first moving image G1 displayed on the first projection surface 3 and the second moving image G2 displayed on the second projection surface 4. Accordingly, a difference between the number of the first people and the number of the second people is highly likely to represent a relative difference between a level of interest in the first moving image G1 and a level of interest in the second moving image G2. Therefore, in a situation in which the first projection surface 3 and the second projection surface 4 are located in portions different from each other of the predetermined surface, by changing a moving image displayed on each of the first projection surface 3 and the second projection surface 4 according to a comparison result of the number of the first people and the number of the second people, it is possible to switch display of a moving image in which viewers have low interest and to which the viewers are hardly attracted to display of a moving image in which viewers have high interest and to which the viewers are attracted.

B. Modifications

Forms of modifications of the embodiment illustrated above are illustrated below. Two or more forms optionally selected from the following illustration may be combined as appropriate in a range in which the forms are not contradictory to one another.

B1. First Modification

In the first embodiment, the projector system 1000 may include one first projector 1 and a plurality of second projectors 2. Further, the projectors included in the projector system 1000 may be capable of projecting separate moving images and projecting images projected by the other projectors included in the projector system 1000. In this case, numbers of the second people are present by the number of the second projectors 2. The operation shown in FIG. 7 is changed as explained below.

In step S203, the comparing section 152 determines whether a number smaller than the first threshold is present among the number of the first people and the numbers of the second people.

In step S204, the comparing section 152 determines whether a number exceeding the second threshold is present among the number of the first people and the numbers of the second people.

In step S207, the comparing section 152 compares the number smaller than the first threshold among the number of the first people and the numbers of the second people and the number exceeding the second threshold among the number of the first people and the numbers of the second people.

For example, it is assumed that, in a situation in which the projector system 1000 includes one first projector 1 and two second projectors 2, only the number of the first people is present as the number smaller than the first threshold among one number of the first people and two numbers of the second people and only one number of the second people is present as the number exceeding the second threshold among the one number of the first people and the two numbers of the second people. In this situation, in step S207, the comparing section 152 compares the one number of the first people, which is the number smaller than the first threshold, and the one number of the second people, which is the number exceeding the second threshold.

In step S208, the comparing section 152 determines whether the number of the first people is smaller than the first threshold.

In step S209, the first control section 153 causes the first projecting section 11 to project a moving image that the first control section 153 causes the second projector 2, the number of second peoples of which exceeds the second threshold, among the plurality of second projectors 2 to project. When a plurality of second projectors 2, the numbers of the second peoples of which exceed the second threshold, are present, the first control section 153 causes the first projecting section 11 to project a moving image that the first control section 153 causes the second projector 2, the number of the second peoples of which is the largest, to project.

In step S210, the first control section 153 specifies a largest number among numbers exceeding the second threshold among the number of the first people and the numbers of the second people and transmits instruction information for instructing projection of a moving image, which the first control section 153 causes a projector corresponding to the largest number to project, to the second projector 2, the number of the second people of which is smaller than the first threshold, from the first communication section 13.

Figure 12:
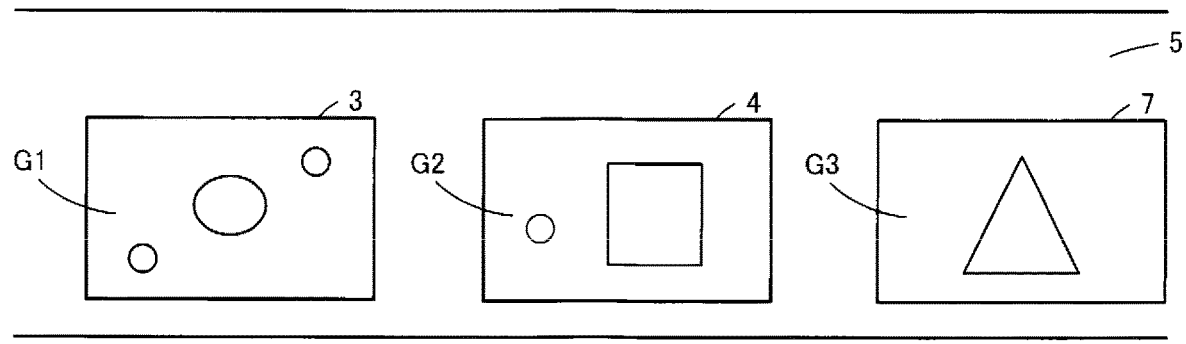
FIG. 12 is a diagram showing an example of projection according to a first modification.

It is assumed that the projector system 1000 includes the first projector 1, the second projector 2, and a third projector having the same configuration as the configuration of the second projector 2. As illustrated in FIG. 12, it is assumed that the first moving image G1 is displayed on the first projection surface 3, the second moving image G2 is displayed on the second projection surface 4, and the third projector is displaying a third moving image G3 named C on a third projection surface 7.

Figure 13:
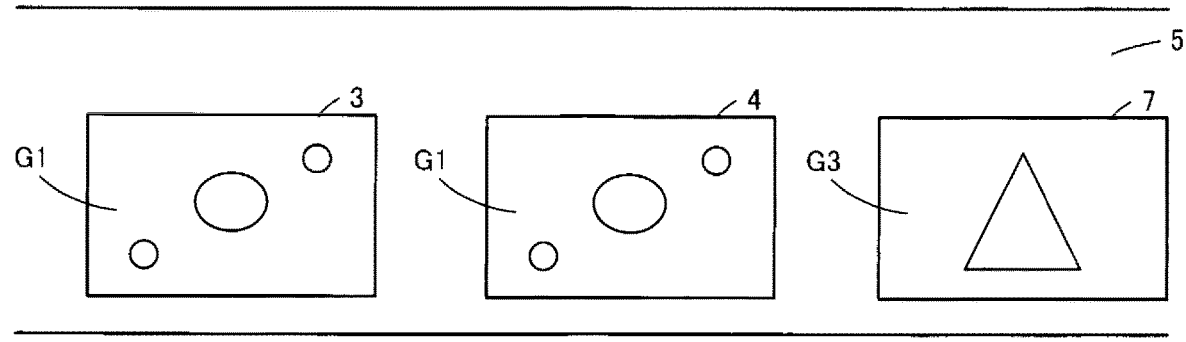
FIG. 13 is a diagram showing another example of the projection according to the first modification.

In a situation illustrated in FIG. 12, when the number of the first people exceeds the second threshold, the number of the second people of the second projector 2 is smaller than the first threshold, and the number of the second people of the third projector is equal to or larger than the first threshold and smaller than the second threshold, as illustrated in FIG. 13, the first moving image G1 is displayed on both of the first projection surface 3 and the second projection surface 4. The display of the third moving image G3 on the third projection surface 7 is maintained.

Therefore, it is possible to switch a moving image displayed on the second projection surface 4 from a moving image in which viewers have low interest and to which the viewers are hardly attracted to a moving image in which viewers have high interest and to which the viewers are attracted. The display of the third moving image G3 for which viewers equal to or more than the first threshold are present is maintained. Therefore, it is possible to suppress an image in which viewers are assumed to have interest from being changed to another image.

B2. Second Modification

In the first embodiment and the first modification, the first specifying section 151 is not limited to the configuration for specifying the number of the first people based on the first imaging data. For example, the first specifying section 151 may specify the number of the first people based on an output of an infrared sensor that detects people present in the first region R1. The first specifying section 151 may specify the number of the first people based on an output of a weight sensor disposed on the floor 6 in the first region R1. For example, the first specifying section 151 may specify the number of the first people by dividing weight indicated by the output of the weight sensor by weight of one person determined in advance.

In the first embodiment and the first modification, the second specifying section 251 is not limited to the configuration for specifying the number of the second people based on the second imaging data. For example, the second specifying section 251 may specify the number of the second people based on an output of an infrared sensor that detects people present in the second region R2. The second specifying section 251 may specify the number of the second people based on an output of a weight sensor disposed on the floor 6 in the second region R2. For example, the second specifying section 251 may specify the number of the second people by dividing weight indicated by the output of the weight sensor by weight of one person determined in advance.

B3. Third Modification

In the first embodiment and the first and second modifications, the liquid crystal light valve 114 is used as an example of the light modulating device. However, the light modulating device is not limited to the liquid crystal light valve and can be changed as appropriate. For example, the light modulating device may be configured to include three reflection-type liquid crystal panels. The light modulating device may have a configuration of a type including one liquid crystal panel, a type including three digital mirror devices (DMDs), a type including one digital mirror device, or the like. When only one liquid crystal panel or DMD is used as the light modulating device, members equivalent to the color separation optical system and the color combination optical system are unnecessary. Besides the liquid crystal panel and the DMD, a component capable of modulating light emitted by the light source 113 can be adopted as the light modulating device.

B4. Fourth Modification

In the first embodiment and the first to third modifications, the projector is used as the display device. However, the display device may be a display device of a direct-view type such as a liquid crystal display device or an organic EL (Electro Luminescence) display device.

What is claimed is:

1. A control method for a display device comprising:
    displaying a first image on a first display surface;
    specifying a number of first people viewing the first image displayed on the first display surface;
    receiving, from another display device that displays a second image different from the first image on a second display surface different from the first display surface, number-of-people information indicating a specifying result of a number of second people viewing the second image displayed on the second display surface;
    comparing the number of the first people and the number of the second people; and
    displaying the second image on the first display surface when the number of the first people is smaller than the number of the second people, while keeping the second image displayed on the second display surface; and
    transmitting, to the other display device, first image instruction information for instructing display of the first image on the second display surface when the number of the first people is larger than the number of the second people while keeping the first image displayed on the first display surface.

2. The control method for the display device according to claim 1, wherein the number-of-people information is transmitted from the other display device in a situation in which the number of the second people is smaller than a first threshold and a situation in which the number of the second people exceeds a second threshold larger than the first threshold.

3. The control method for the display device according to claim 2, further comprising executing the comparison in a situation in which one of the number of the first people and the number of the second people is smaller than the first threshold and another of the number of the first people and the number of the second people exceeds the second threshold.

4. The control method for the display device according to claim 1, further comprising executing the comparison after a first time elapses from a start of the display of the first image on the first display surface.

5. The control method for the display device according to claim 1, further comprising:
    transmitting second image instruction information for instructing display of the second image on the second display surface to the other display device to thereby cause the other display device to execute the display of the second image on the second display surface; and
    executing the comparison after elapse of a second time from the transmission of the second image instruction information.

6. The control method for the display device according to claim 1, wherein the first display surface and the second display surface are located in portions different from each other of a predetermined surface.

7. A display device comprising:
    a display section configured to display a first image on a first display surface;
    a specifying section configured to specify a number of first people viewing the first image displayed on the first display surface;
    a communication section configured to receive, from another display device that displays a second image different from the first image on a second display surface different from the first display surface, number-of-people information indicating a specifying result of a number of second people viewing the second image displayed on the second display surface;
    a comparing section configured to compare the number of the first people and the number of the second people; and
    a control section configured to control the display section to display the second image on the first surface when the number of the first people is smaller than the number of the second people, while keeping the second image displayed on the second display surface; and control the communication section to transmit, to the other display device, first image instruction information for instructing display of the first image on the second display surface when the number of the first people is larger than the number of the second people, while keeping the first image displayed on the first display surface.

8. The display device according to claim 7, wherein the number-of-people information is transmitted from the other display device in a situation in which the number of the second people is smaller than a first threshold and a situation in which the number of the second people exceeds a second threshold larger than the first threshold.

9. The display device according to claim 8, wherein the comparing section executes the comparison in a situation in which one of the number of the first people and the number of the second people is smaller than the first threshold and another of the number of the first people and the number of the second people exceeds the second threshold.

10. The display device according to claim 7, wherein the comparing section executes the comparison after a first time elapses from a start of the display of the first image on the first display surface.

11. The display device according to claim 7, wherein
    the control section controls the communication section to transmit second image instruction information for instructing display of the second image on the second display surface to the other display device,
    the other display device displays the second image on the second display surface according to reception of the second image instruction information; and
    the comparing section executes the comparison after elapse of a second time from the transmission of the second image instruction information.

12. The display device according to claim 7, wherein the first display surface and the second display surface are located in portions different from each other of a predetermined surface.

* * * * *